(12) United States Patent
Hsu

(10) Patent No.: US 9,396,869 B2
(45) Date of Patent: Jul. 19, 2016

(54) INDUCTIVELY COUPLED POWER TRANSFER SYSTEM AND DEVICE

(71) Applicant: PowerWow Technology Inc., Zhubei, Hsinchu County (TW)

(72) Inventor: Jr-Uei Hsu, Taipei (TW)

(73) Assignee: POWERWOW TECHNOLOGY INC., Hsinchu County (TW)

( * ) Notice: Subject to any disclaimer, the term of this patent is extended or adjusted under 35 U.S.C. 154(b) by 462 days.

(21) Appl. No.: 13/948,804

(22) Filed: Jul. 23, 2013

(65) Prior Publication Data
US 2014/0028108 A1  Jan. 30, 2014

(30) Foreign Application Priority Data

Jul. 24, 2012  (TW) .............................. 101126626 A

(51) Int. Cl.
*H01F 38/14* (2006.01)
*H02J 5/00* (2016.01)

(52) U.S. Cl.
CPC ................ *H01F 38/14* (2013.01); *H02J 5/005* (2013.01)

(58) Field of Classification Search
CPC .................................. H02J 5/005; H01F 38/14
USPC .......................................................... 307/104
See application file for complete search history.

(56) References Cited

U.S. PATENT DOCUMENTS

| 2007/0109708 | A1 | 5/2007 | Hussman et al. | |
| 2009/0243397 | A1* | 10/2009 | Cook | H02J 5/005 307/104 |
| 2011/0156489 | A1* | 6/2011 | Kim | H04B 5/0075 307/104 |
| 2011/0304216 | A1* | 12/2011 | Baarman | H02J 17/00 307/104 |
| 2013/0021033 | A1* | 1/2013 | Stoeckel | A61B 5/055 324/318 |

* cited by examiner

*Primary Examiner* — Kenneth B Wells
*Assistant Examiner* — James P Evans
(74) *Attorney, Agent, or Firm* — Abelman, Frayne & Schwab

(57) ABSTRACT

An inductively coupled power transfer (ICPT) system includes a primary winding for generating an electromagnetic field (EMF), and an ICPT device. The ICPT device includes a phase detecting winding which generates a detecting voltage according to the EMF, a resonant circuit which has an adjustable reactance and which generates an AC voltage according to the EMF and the adjustable reactance, and a control circuit which compares a phase of the AC voltage with a phase of the detecting voltage so as to determine whether said resonant circuit operates in an under-tuned or an over-tuned interval, and which varies the adjustable reactance according to the output voltage and one of the under-tuned and over-tuned intervals.

24 Claims, 15 Drawing Sheets

INDUCTIVELY COUPLED POWER TRANSFER SYSTEM AND DEVICE

CROSS-REFERENCE TO RELATED APPLICATION

This application claims priority to Taiwanese Patent Application No. 101126626, filed on Jul. 24, 2012, the content of which is incorporated by reference herein in its entirety.

BACKGROUND OF THE INVENTION

1. Field of the Invention

The invention relates to an inductively coupled power transfer (ICPT) system and a contactless ICPT device.

2. Description of the Related Art

An inductively coupled power transfer (ICPT) system, due to the capability of contactless electric power transfer, may replace some conventional conductive power transfer systems so as to avoid connections. Since a requirement for electric power is not always constant, an output voltage of the ICPT system may be unstable as a result of surplus electric power when a load supplied thereby decreases. Therefore, a control system is needed to maintain the same output voltage under different load conditions.

As shown in FIG. 1, when capacitance of a resonant circuit in the ICPT system is changed, a variation tendency of the output voltage is a bell curve. The curves with different Q factors are also depicted in FIG. 1. A point at which the output voltage has a maximum value is where the resonant circuit is fully-tuned. When the fully-tuned point is adopted as a demarcation, an interval where the capacitance is decreased represents an under-tuned interval, and an interval where the capacitance is increased represents an over-tuned interval.

A conventional ICPT system is disclosed in U.S. Patent Application Publication No. 20070109708. Capacitance of the conventional ICPT system is adjustable, and by adjusting the capacitance, an output voltage thereof may be controlled.

However, the conventional ICPT system has the following deficiencies:

1. Only one proportional-integral controller (PI controller) is used, so that the output voltage may be only controlled to one of increasing along with the capacitance, and decreasing along with the capacitance. In order to maintain the output voltage at a preset value, only one of the under-tuned interval and the over-tuned interval may be adopted for operation.

2. In the meantime, an operational point of the ICPT system may not approach the fully-tuned state, since when approaching the fully-tuned state, the output voltage changes dramatically along with the capacitance, so that an issue of the capacitance to be adjusted diverging in one direction because of accidentally striding across different operational intervals may take place and results in failed adjustment.

3. Further, the conventional ICPT system may be unsuitable for a load which requires a high output voltage since the operational point may not approach the fully-tuned state.

SUMMARY OF THE INVENTION

Therefore, an object of the present invention is to provide an inductively coupled power transfer (ICPT) system capable of full interval adjustment. Accordingly, the ICPT system of the present invention comprises a primary winding and a contactless ICPT device. The primary winding is for generating an electromagnetic field in response to an alternating current (AC). The contactless ICPT device includes a phase detecting winding, a resonant circuit and a control circuit. The phase detecting winding generates a detecting voltage according to induction of the electromagnetic field. The resonant circuit has an adjustable reactance that is associated with a resonant frequency of the resonant circuit, and is adapted to generate an AC voltage according to induction of the electromagnetic field and the adjustable reactance for supplying an output voltage associated with the AC voltage to a load. The control circuit is coupled electrically to the phase detecting winding and the resonant circuit and to be coupled electrically to the load. The control circuit compares a phase of the AC voltage with a phase of the detecting voltage so as to determine whether the resonant circuit operates in an under-tuned interval, where the output voltage monotonically decreases along with an increase in the resonant frequency, or an over-tuned interval, where the output voltage monotonically increases along with an increase in the resonant frequency, and the control circuit varies the adjustable reactance according to at least the output voltage and one of the under-tuned interval and the over-tuned interval in which the resonant circuit operates, for control of the output voltage.

An effect of the present invention resides in that, by using the control circuit to determine which one of the under-tuned interval and the over-tuned interval to operate in, and to vary the adjustable reactance according thereto, full interval adjustment may be achieved.

BRIEF DESCRIPTION OF THE DRAWINGS

Other features and advantages of the present invention will become apparent in the following detailed description of four preferred embodiments with reference to the accompanying drawings, of which.

DETAILED DESCRIPTION OF THE PREFERRED EMBODIMENTS

Figure 1:
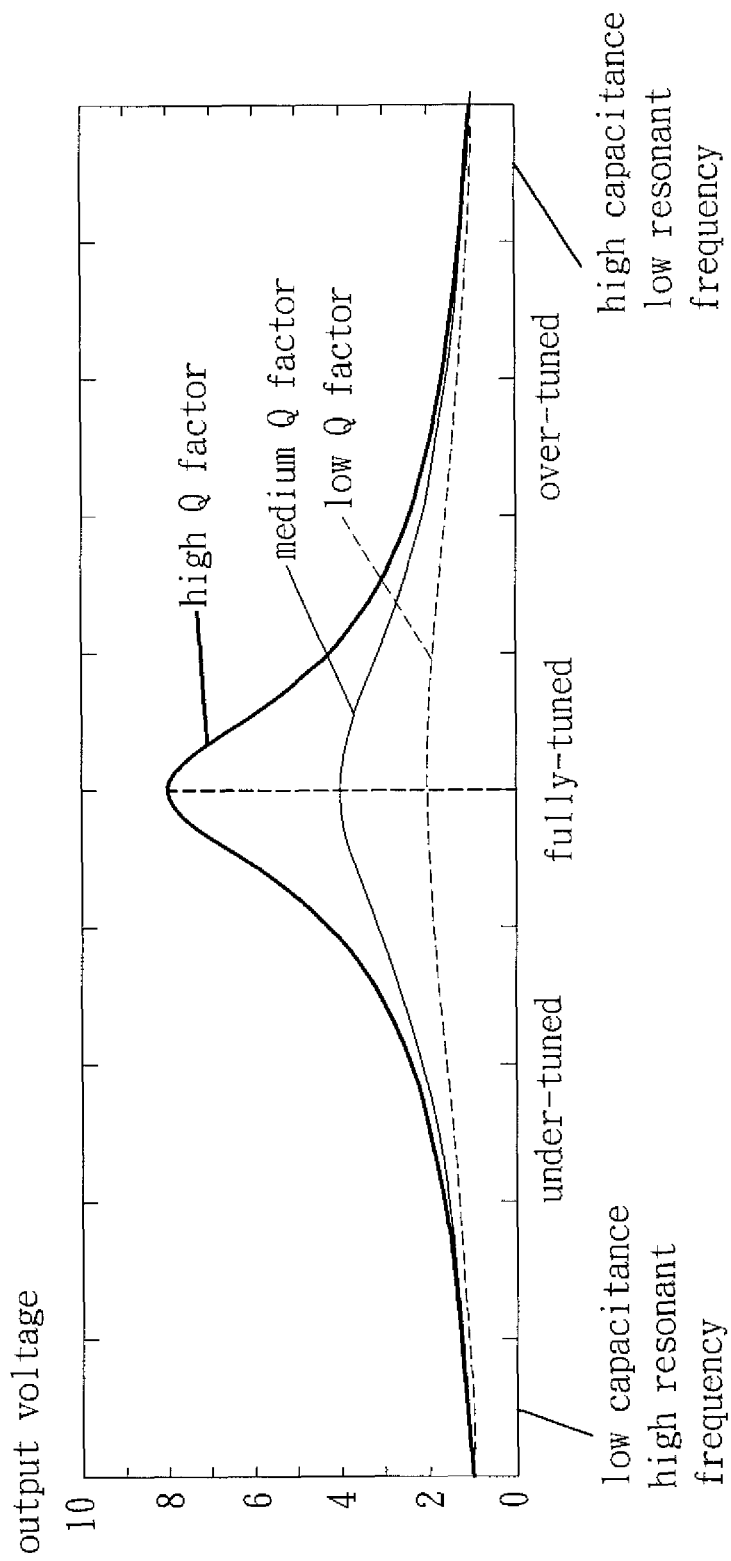
FIG. 1 illustrates curves of output voltage versus equivalent capacitance of a resonant circuit.

Before the present invention is described in greater detail with reference to the four accompanying preferred embodiments, it should be noted herein that like elements are denoted by the same reference numerals throughout the disclosure.

Figure 2:
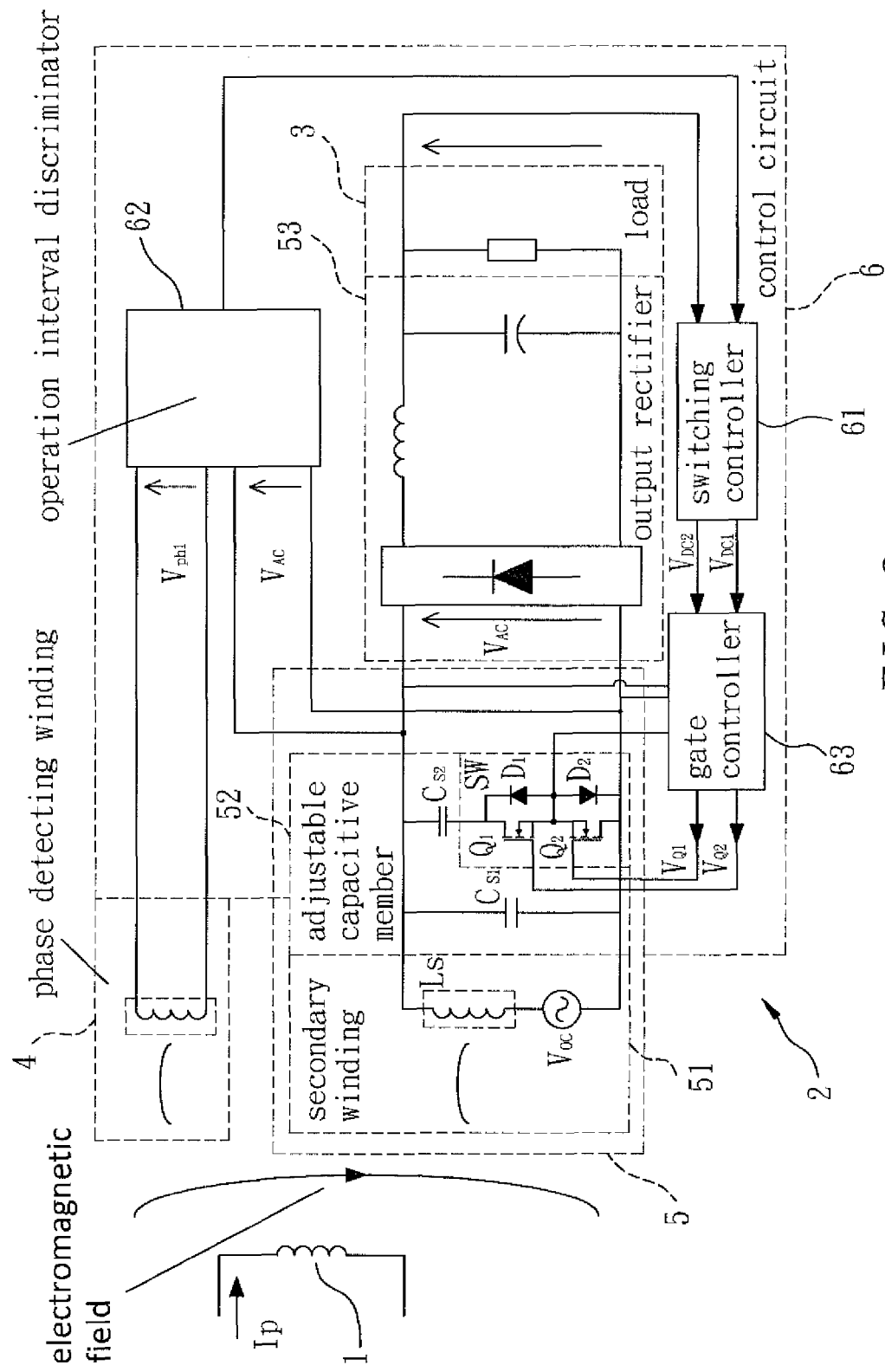
FIG. 2 is a circuit diagram of a first preferred embodiment of an inductively coupled power transfer (ICPT) system according to the present invention.

Referring to FIG. 2, a first preferred embodiment of an inductively coupled power transfer (ICPT) system according to the present invention is illustrated to be adapted for proving electric power to a load 3. The first preferred embodiment of the ICPT system comprises a primary winding 1 and a contactless ICPT device 2.

The primary winding 1 is adapted for generating an electromagnetic field in response to an alternating current (AC) $I_p$. The contactless ICPT device 2 includes a phase detecting winding 4, a resonant circuit 5 and a control circuit 6.

The phase detecting winding 4 generates a detecting voltage $V_{ph1}$ according to induction of the electromagnetic field.

The resonant circuit 5 has an adjustable reactance that is associated with a resonant frequency of the resonant circuit 5, and is adapted to generate an AC voltage $V_{AC}$ according to induction of the electromagnetic field and the adjustable reactance for supplying an output voltage associated with the AC voltage $V_{AC}$ to the load 3. The AC voltage $V_{AC}$ and the detecting voltage $V_{ph1}$ have a phase difference therebetween, and the phase difference changes along with the adjustable reactance. The resonant circuit 5 includes a secondary winding 51 and an adjustable capacitive member 52.

The secondary winding 51 includes a coil inductor having a self-inductance of $L_S$. Theoretically, when the secondary winding 51 is situated in open circuit, an open-circuit voltage $V_{OC}$ generated between two terminals of the secondary winding 51 according to induction of the electromagnetic field is in-phase with respect to the detecting voltage $V_{ph1}$. Generally, there is technical difficulty in detecting the open-circuit voltage $V_{OC}$ directly from the secondary winding 51, and hence the phase detecting winding 4 is utilized herein for indirectly detecting a phase of the open-circuit voltage $V_{OC}$.

The adjustable capacitive member 52 is coupled electrically to the control circuit 6 and between the two terminals of the secondary winding 51 for receiving the open-circuit voltage $V_{OC}$, generates the AC voltage $V_{AC}$, and is controlled by the control circuit 6 to vary the adjustable reactance of the resonant circuit 5. In this embodiment, the adjustable capacitive member 52 includes a first capacitor $C_{S1}$, a second capacitor $C_{S2}$ and a switch (SW). The first capacitor $C_{S1}$ is connected in parallel with a series connection of the second capacitor $C_{S2}$ and the switch (SW). The switch (SW) is coupled electrically to the control circuit 6 and is controlled thereby to adjust a charge current of the second capacitor $C_{S2}$ (i.e., to adjust equivalent capacitance of the second capacitor $C_{S2}$) so as to vary the adjustable reactance of the resonant circuit 5. In this embodiment, the switch (SW) includes two transistors $Q_1$ and $Q_2$, each of which is controlled by the control circuit 6 to switch between conduction and nonconduction.

The first transistor $Q_1$ has a first end which is coupled electrically to the second capacitor $C_{S2}$, a second end and a control end. The first transistor $Q_1$ is provided with a parasitic diode $D_1$, and the parasitic diode $D_1$ has a cathode coupled electrically to the first end of the first transistor $Q_1$, and an anode coupled electrically to the second end of the first transistor $Q_1$.

The second transistor $Q_2$ has a first end which is coupled electrically to the first capacitor $C_{S1}$, a second end which is coupled electrically to the second end of the first transistor $Q_1$, and a control end. The second transistor $Q_2$ is provided with a parasitic diode $D_2$, and the parasitic diode $D_2$ has a cathode coupled electrically to the first end of the second transistor $Q_2$, and an anode coupled electrically to the second end of the second transistor $Q_2$.

In this embodiment, each of the first and second transistors $Q_1$ and $Q_2$ is a N-type metal-oxide-semiconductor field-effect transistor (MOSFET), and for each of the first and second transistors $Q_1$ and $Q_2$, the first end is the drain terminal, the second end is the source terminal, and the control end is the gate terminal.

As previously mentioned, the AC voltage $V_{AC}$ is associated with frequency response of the resonant circuit 5. Adjusting the adjustable capacitive member 52 will change the AC voltage $V_{AC}$. The equivalent capacitance of the second capacitor $C_{S2}$ in combination with the switch (SW) may vary in a range from zero to capacitance of the second capacitor $C_{S2}$, and this range must relate to three control intervals of the resonant circuit 5 (i.e., fully-tuned, under-tuned and over-tuned). The first capacitor $C_{S1}$ is used for providing basic capacitance, so that the AC voltage $V_{AC}$ may be maintained within a reasonable range.

When the load 3 is an AC load, the AC voltage $V_{AC}$ may be directly provided from the resonant circuit 5 to the load 3. In this embodiment, a direct current (DC) load is taken as an example for explanation. When the load 3 is a DC load, the resonant circuit 5 further includes an output rectifier 53. The output rectifier 53 is coupled electrically to the adjustable capacitive member 52 and the load 3 for receiving the AC voltage $V_{AC}$, and rectifies and filters the AC voltage $V_{AC}$ so as to output a DC voltage $V_L$ to the load 3.

Referring to FIG. 1, adjusting the adjustable reactance of the resonant circuit 5 is analogous to adjusting the resonant frequency of the resonant circuit 5. A curve of output voltage versus resonant frequency is bell-shaped. A point at which the output voltage has a maximum value is called fully-tuned. When the fully-tuned point is adopted as a demarcation, an interval where the equivalent capacitance is decreased (the resonant frequency is increased) represents an under-tuned interval, and an interval where the equivalent capacitance is increased (the resonant frequency is decreased) represents an over-tuned interval.

Figure 3:
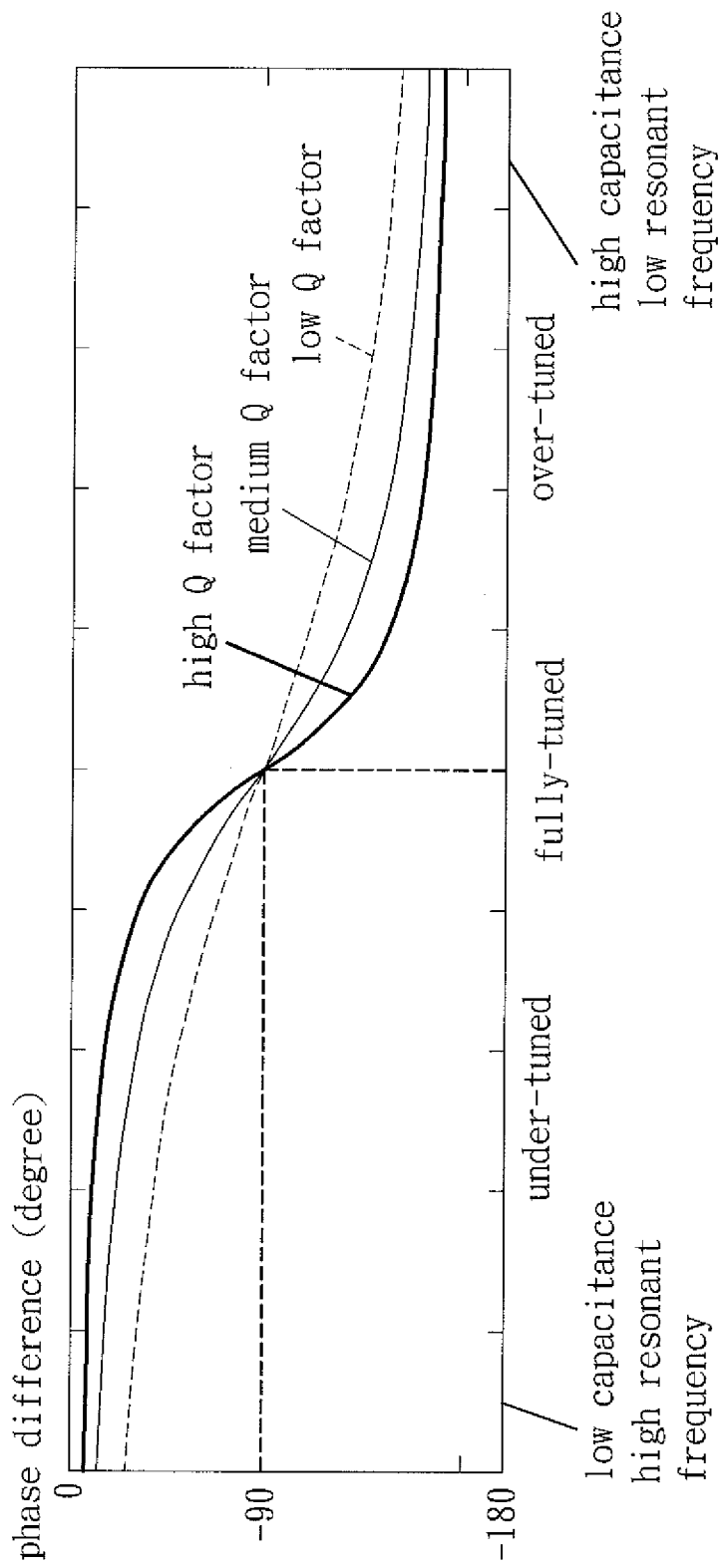
FIG. 3 illustrates curves of phase difference versus capacitance of the first preferred embodiment, wherein the phase difference is between an AC voltage and an open-circuit voltage.

For the purpose of operating in one of the under-tuned, fully-tuned and over-tuned intervals, it is necessary to determine which one of the intervals for adjustment is currently operated in. Theoretically, the adjustable reactance of the resonant circuit 5 results in a phase difference existing between the AC voltage $V_{AC}$ and the open-circuit voltage $V_{OC}$. FIG. 3 illustrates curves of phase difference versus resonant frequency, wherein the phase difference is between the AC voltage $V_{AC}$ and the open-circuit voltage $V_{OC}$. When the phase of the AC voltage $V_{AC}$ falls behind the phase of the open-circuit voltage $V_{OC}$ by one of a difference smaller than, equal to and greater than 90 degrees, a respective one of the under-tuned, fully-tuned and over-tuned interval is correspondingly operated in. Therefore, by taking the 90-degree phase difference therebetween as a demarcation, which one of the intervals for adjustment is currently operated in may be determined.

Referring to FIG. 2, the control circuit 6 includes a switching controller 61, an operation interval discriminator 62 and a gate controller 63.

Figure 6:
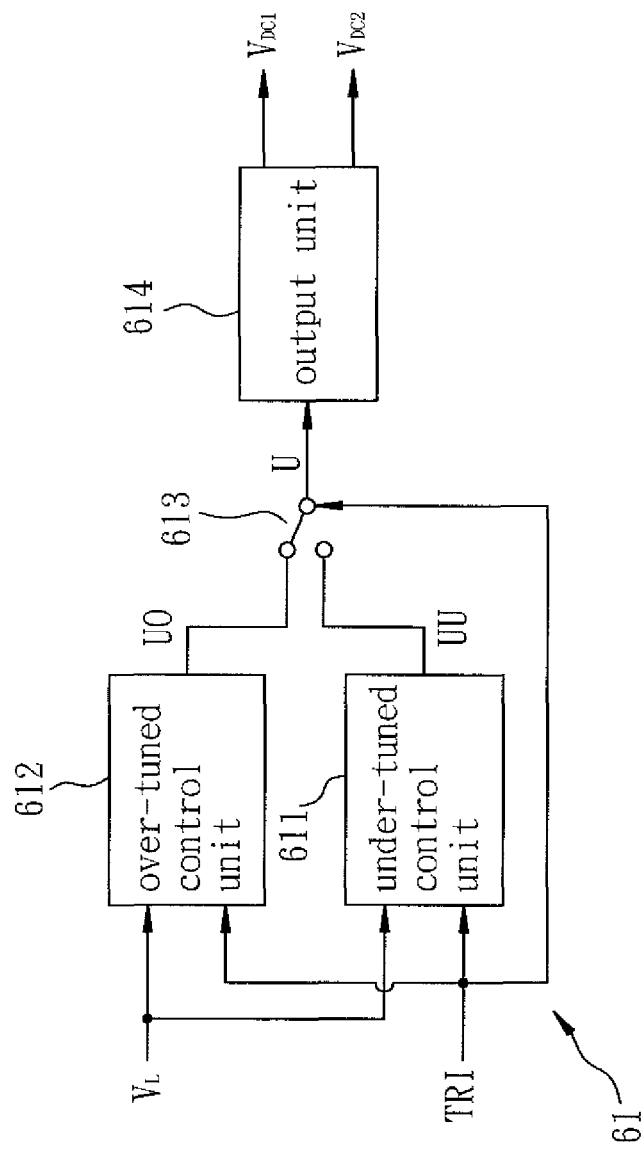
FIG. 6 is a block diagram of a switching controller of the first preferred embodiment.

Referring to FIG. 6, the switching controller 61 includes a first control unit 611 and a second control unit 612, a selector switch 613 and an output unit 614. Each of the first and second control units 611 and 612 is to be coupled electrically to the load 3 for detecting the output voltage across the load 3, and is triggered to control the resonant circuit 5 which operates in a respective one of the under-tuned interval and the over-tuned interval so as to generate adjustment information associated with the output voltage. The adjustment information is to serve as a basis for varying the adjustable reactance. It is noted that the first and second control units 611 and 612 are not limited to be integrated with the selector switch 613 in the same module, i.e., the switching controller 61, and may be disposed in a separate module from the selector switch 614 in another configuration of this embodiment.

Figure 4:
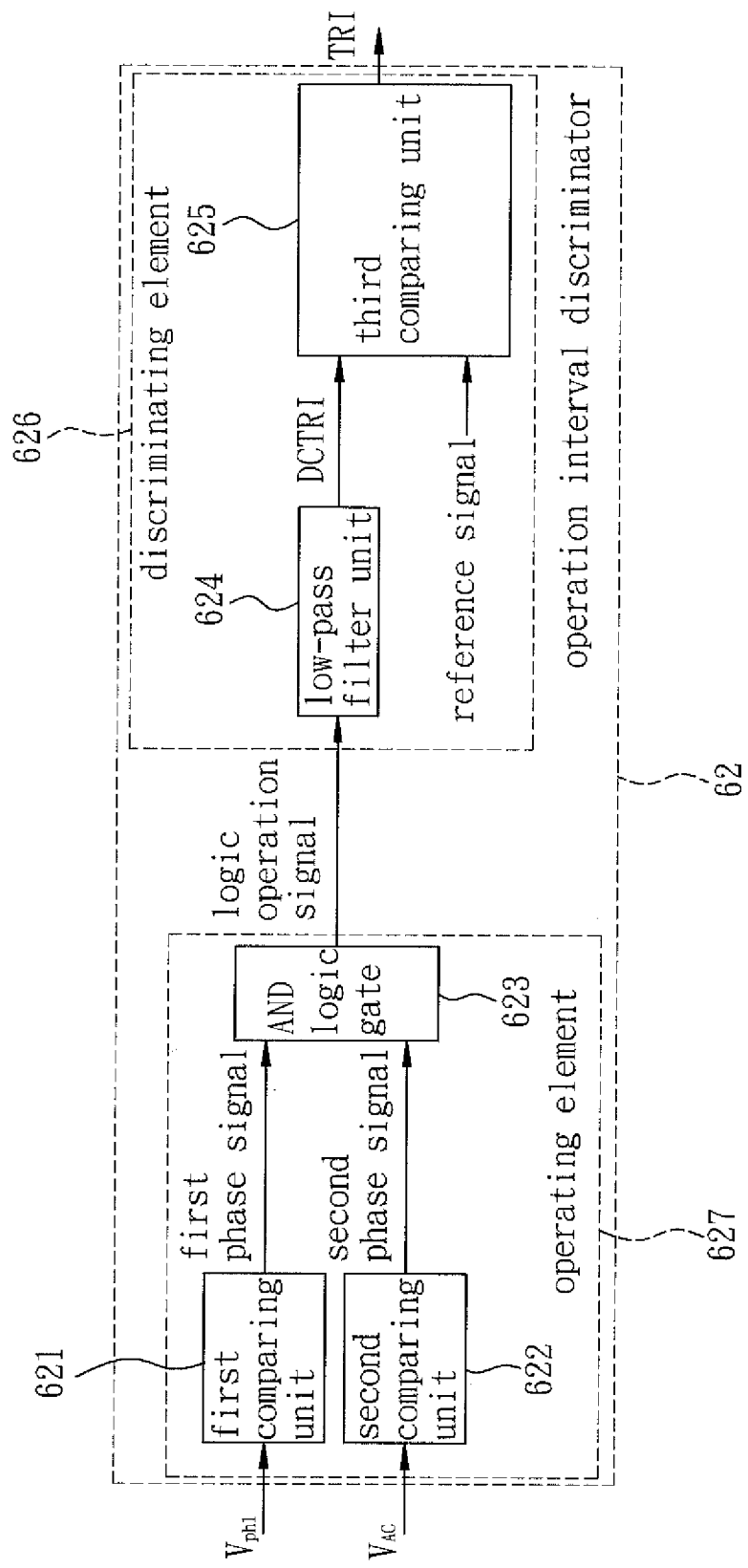
FIG. 4 is a block diagram of an operation interval discriminator of the first preferred embodiment.
Figure 5:
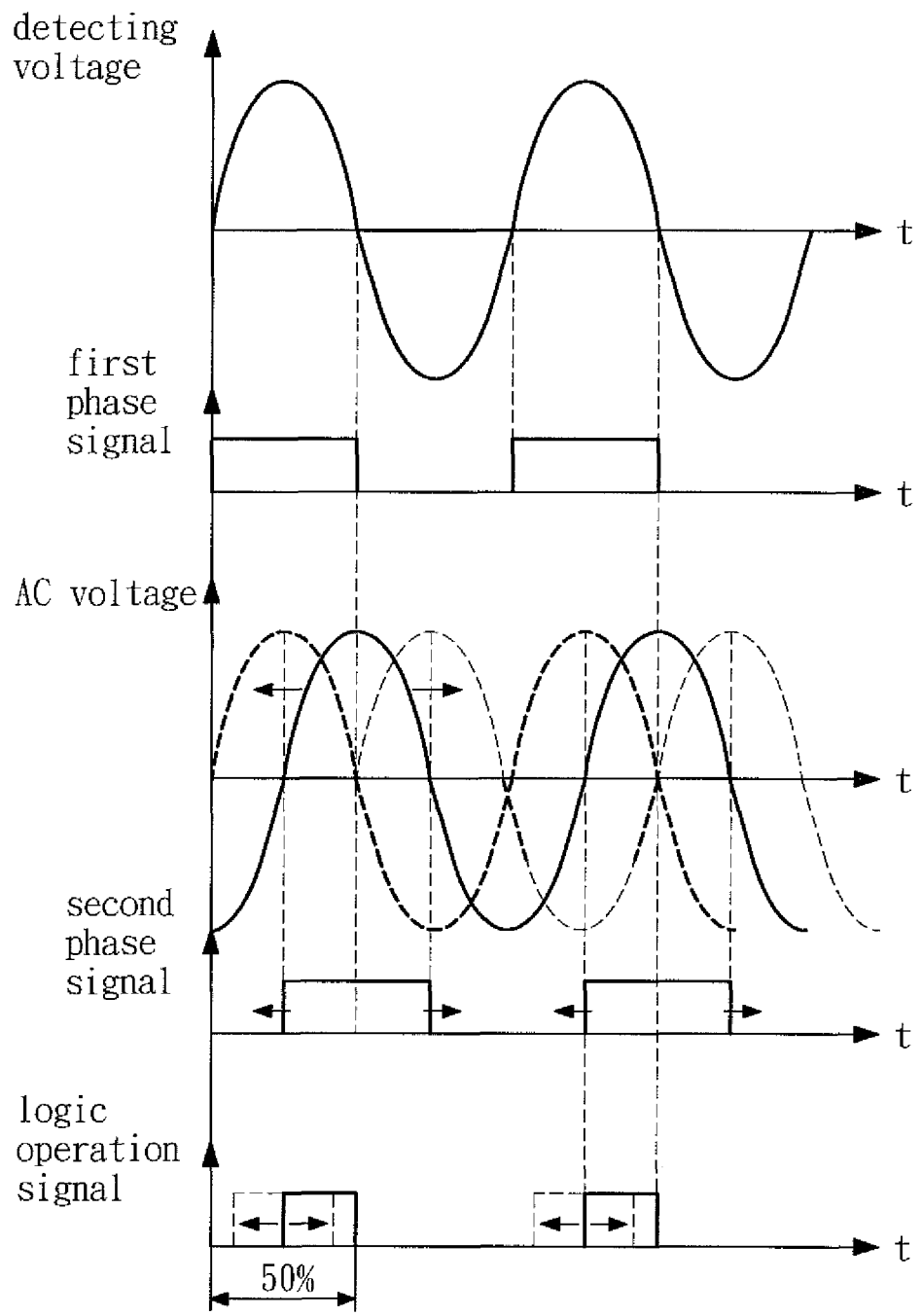
FIG. 5 illustrates signals processed by the operation interval discriminator.

Referring to FIG. 4 and FIG. 5, the operation interval discriminator 62 is coupled electrically to the switching controller 61, and to the phase detecting winding 4 and the resonant circuit 5 for detecting respectively the detecting voltage $V_{ph1}$ and the AC voltage $V_{AC}$, and generates an operation interval indication signal (TRI) according to the phase difference between the detecting voltage $V_{ph1}$ and the AC voltage $V_{AC}$, so as to trigger one of the first and second control units 611 and 612 based on the operation interval indication signal (TRI). The operation interval discriminator 62 includes an operating element 627 and a discriminating element 626.

The operating element 627 is coupled electrically to the phase detecting winding 4 and the resonant circuit 5 for detecting respectively the detecting voltage $V_{ph1}$ and the AC voltage $V_{AC}$, and generates a logic operation signal according to the detecting voltage $V_{ph1}$ and the AC voltage $V_{AC}$. The logic operation signal has a duty cycle (conduction ratio) associated with the phase difference between the detecting voltage $V_{ph1}$ and the AC voltage $V_{AC}$. The operation element 627 includes a first comparing unit 621, a second comparing unit 622 and an AND logic gate 623.

The first comparing unit 621 is coupled electrically to the phase detecting winding 4 for receiving the detecting voltage $V_{ph1}$, and compares the detecting voltage $V_{ph1}$ with a reference voltage, so as to generate a first phase signal in a logic form. In this embodiment, the reference voltage is a zero voltage. The second comparing unit 622 is coupled electrically to the resonant circuit 5 for receiving the AC voltage $V_{AC}$, and compares the AC voltage $V_{AC}$ with the reference voltage (i.e., the zero voltage), so as to generate a second phase signal in a logic form.

The AND logic gate 623 is coupled electrically to the first and second comparing units 621 and 622 for receiving respectively the first and second phase signals, and performs logical conjunction on the first and second phase signals, so as to generate the logic operation signal. The duty cycle of the logic operation signal has a substantially inverse relationship with the phase difference. When the first and second phase signals are both at logic 1, the logic operation signal is at logic 1, and the logic operation signal is at logic 0 if otherwise. The logic operation signal, the first and second phase signals, and the detecting voltage $V_{ph1}$ have substantially the same periods, which are also substantially identical to an inverse of a frequency of the oscillations of alternating current in the whole ICPT system. The logic operation signal has a duty cycle that ranges from 0%-50%, meaning that the second phase signal falls behind the first phase signal by 180 degrees to 0 degree.

The first and second comparing units 621 and 622 are merely used for signal conversion. In another configuration, the first and second comparing units 612 and 622 may be omitted, and the AND logic gate 623 may be coupled electrically and directly to the phase detecting winding 4 and the resonant circuit 5 for receiving the detecting voltage $V_{ph1}$ and the AC voltage $V_{AC}$. The AND logic gate 623 performs logic operations so as to generate the aforesaid logic operation signal.

The discriminating element 626 is coupled electrically to the AND logic gate 623 for receiving the logic operation signal, stores a reference signal representing a phase difference between the detecting voltage $V_{ph1}$ and the AC voltage $V_{AC}$ at which the output voltage has a maximum value (i.e., a phase difference of 90 degrees), and generates the operation interval indication signal (TRI) based on a comparison between the logic operation signal and the reference signal, so as to determine a current one of the under-tuned, fully-tuned and over-tuned intervals for adjustment.

The discriminating element 626 may be a digital signal processor, and may be alternatively implemented using analog circuits. For example, the discriminating element 626 includes a low-pass filter unit 624 and a third comparing unit 625. The low-pass filter unit 624 is coupled electrically to the AND logic gate 623 for receiving the logic operation signal, and averages the logic operation signal so as to output an analog direct current (DC) indication signal (DCTRI) that is indicative of the phase difference between the detecting voltage $V_{ph1}$ and the AC voltage $V_{AC}$. A value of the DC indication signal (DCTRI) is an average of the logic operation signal. For example, when the logic operation signal has the duty cycle of 30%, and the logic 1 is represented by 5 volts, the value of the DC indication signal (DCTRI) is 1.5 volts.

The third comparing unit 625 is coupled electrically to the low-pass filter unit 624 for receiving the DC indication signal (DCTRI), and compares the DC indication signal (DCTRI) with the reference signal so as to generate the operation interval indication signal (TRI). When the operation interval indication signal (TRI) is at logic 1, this means that the resonant circuit 5 operates in the under-tuned interval, and when the operation interval indication signal (TRI) is at logic 0, this means that the resonant circuit 5 operates in the over-tuned interval. The reference signal may be provided externally with a voltage equal to a voltage of the logic 1 multiplied by 0.25, and is inputted into the third comparing unit 625.

Referring to FIG. 6, it is further explained herein how the operation interval discriminator 62 controls the first and second control units 611 and 612 based on the operation interval indication signal (TRI). Owing to parameter settings, the first control unit 611 is only capable of controlling the resonant circuit 5 which operates in the under-tuned interval, where the output voltage monotonically decreases along with an increase in the resonant frequency, and thus is named an under-tuned control unit 611. Similarly, the second control unit 612 is only capable of controlling the resonant circuit 5 which operates in the over-tuned interval, where the output voltage monotonically increases along with an increase in the resonant frequency, and thus is named an over-tuned control unit 612. The under-tuned control unit 611 and the over-tuned control unit 612 may adopt the common proportional-integral control.

Each of the under-tuned control unit 611 and the over-tuned control unit 612 stores a load voltage preset value, and is coupled electrically to the load 3 for detecting the DC voltage $V_L$ (i.e., the output voltage across the load 3) and is further coupled electrically to the third comparing unit 625 of the operation interval discriminator 62 for receiving the operation interval indication signal (TRI). When the operation interval indication signal (TRI) is at logic 1, the under-tuned control unit 611 is triggered, such that the under-tuned control unit 611 takes the DC voltage $V_L$ as a feedback signal and compares the DC voltage $V_L$ (i.e., the output voltage) with the load voltage preset value stored therein, so as to output a control signal (UU) that is included in the adjustment information and that is associated with adjustment of the adjustable reactance. Magnitude of the control signal (UU) concerns time of conduction of the first and second transistors Q1 and Q2. When the control signal (UU) is larger, the time of conduction is shorter, equivalent capacitance of the adjustable capacitive member 52 is smaller, and thus the DC voltage $V_L$ is smaller in the under-tuned interval.

When the operation interval indication signal (TRI) is at logic 0, the over-tuned control unit 612 is triggered, such that the over-tuned control unit 612 takes the DC voltage $V_L$ as a feedback signal and compares the DC voltage $V_L$ (i.e., the output voltage) with the load voltage preset value stored therein, so as to output a control signal (UO) that is included in the adjustment information and that is associated with adjustment of the adjustable reactance. Magnitude of the control signal (UO) concerns time of conduction of the first and second transistors Q1 and Q2. When the control signal (UO) is larger, the time of conduction is shorter, equivalent capacitance of the adjustable capacitive member 52 is smaller, and thus the DC voltage $V_L$ is larger in the over-tuned interval.

The selector switch 613 of the switching controller 61 is coupled electrically to the under-tuned and over-tuned control units 611 and 612 for receiving respectively the control signals (UU and UO), and is further coupled electrically to the third comparing unit 625 of the operation interval discriminator 62 for receiving the operation interval indication signal (TRI). The selector switch 613 is controlled by the operation interval indication signal (TRI) to select the control signal (UU or UO), from one of the under-tuned and over-tuned units 611 and 612 that is triggered, based on the operation interval indication signal (TRI). When the operation interval indication signal (TRI) is at logic 1, the selector switch 613 selects the control signal (UU), and when the operation interval indication signal (TRI) is at logic 0, the selector switch 613 selects the control signal (UO). The selector switch 613 outputs a control signal U based on a selected one of the control signals (UU and UO).

In this embodiment, the first and second control units 611 and 612 take the DC voltage $V_L$ as the feedback signal. When the load 3 is an AC load, amplitude of a load AC voltage across the load 3 is taken as the feedback signal.

The output unit 614 is coupled electrically to the selector switch 613 for receiving the control signal U, and multiplies the control signal U by a multiple (GO) so as to generate a first DC control signal $V_{DC1}$ and a second DC control signal $V_{DC2}$ which are substantially equal in magnitude but opposite in sign and which serve as a basis for varying the adjustable reactance of the resonant circuit 5. The following is an equation for the first and second DC control signals $V_{DC1}$ and $V_{DC2}$:

$$V_{DC1} = -V_{DC2} = GO \cdot U$$

In this embodiment, the first and second transistors $Q_1$ and $Q_2$ are MOS transistors. When a transistor is switched from nonconduction to conduction, voltage and current cross-over effect during switching on/off of the transistor will result in power consumption. Preferably, the zero voltage switching technique may be adopted, that is, the first and second transistors $Q_1$ and $Q_2$ are switched to conduction only when the AC voltage $V_{AC}$ across the adjustable capacitive member 52 is zero. Alternatively, if the capacitive member 52 includes at least one inductor, a zero current switching technique may be adopted preferably. The details about the zero current switching technique will be described in other preferred embodiments of this invention.

Figure 7:
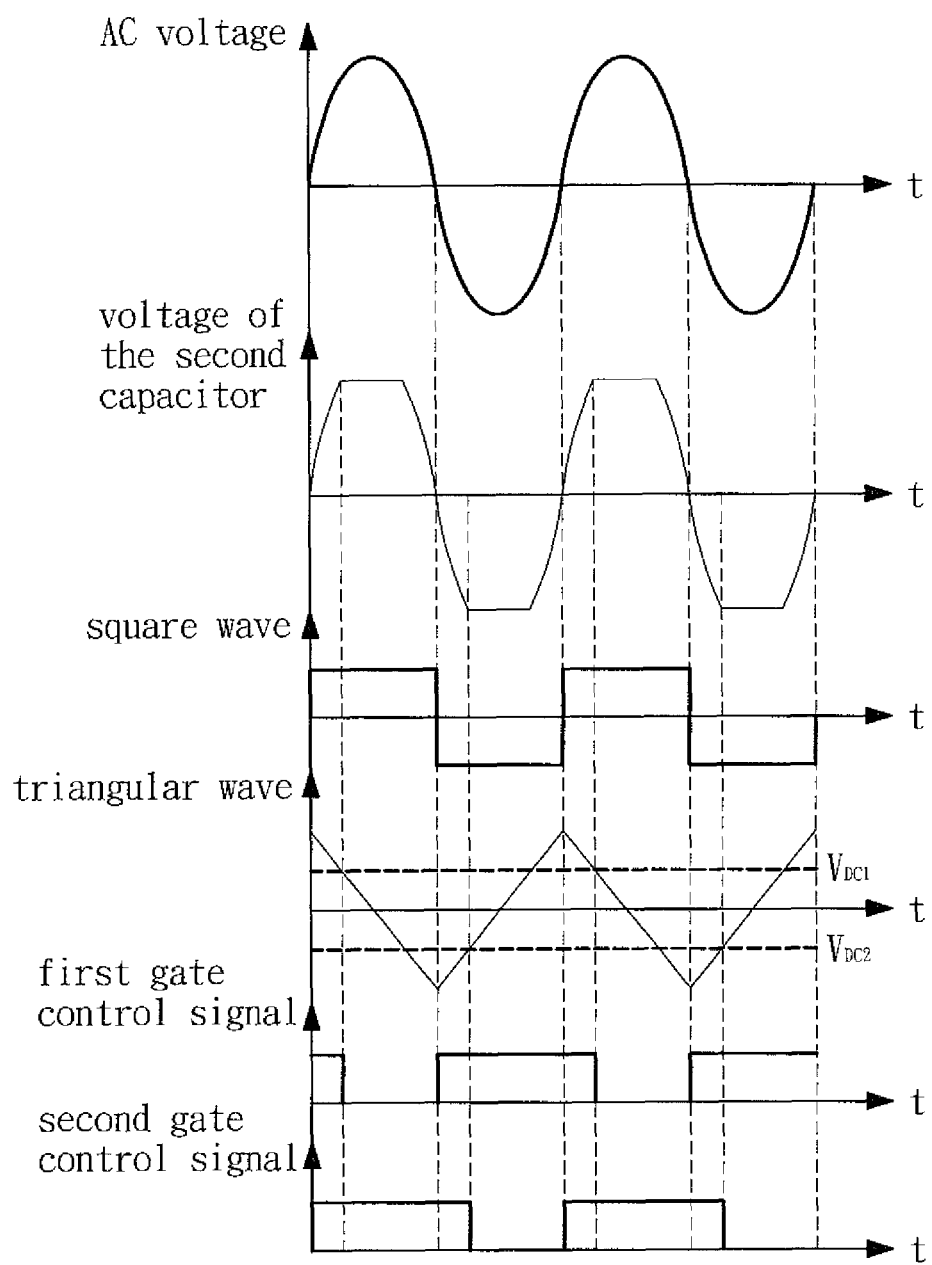
FIG. 7 illustrates signals processed by the switching controller and a gate controller of the first preferred embodiment.

Referring to FIG. 2 and FIG. 7, the gate controller 63 is coupled electrically to the output unit 614 for receiving the first and second DC control signals $V_{DC1}$ and $V_{DC2}$, and is coupled electrically to the resonant circuit 5 for receiving the AC voltage $V_{AC}$. The gate controller 63 first converts the AC voltage $V_{AC}$ into a square wave, which has a positive value when the AC voltage $V_{AC}$ is greater than zero and which has a negative value when AC voltage $V_{AC}$ is smaller than zero, and subsequently converts the square wave into a triangular wave which is symmetric with respect to the zero point. The gate controller 63, according to the square wave, the triangular wave, the first DC control signal $V_{DC1}$ and the second DC control signal $V_{DC2}$, generates a first gate control signal $V_{Q1}$ and a second gate control signal $V_{Q2}$. The gate terminal of each of the first and second transistors $Q_1$ and $Q_2$ is coupled electrically to the gate controller 63 for receiving a respective one of the first gate control signal $V_{Q1}$ and the second gate control signal $V_{Q2}$. When the square wave has the positive value and when the first DC control signal $V_{DC1}$ is greater than the triangular wave, the first gate control signal $V_{Q1}$ is configured to control the first transistor $Q_1$ to be nonconductive. Otherwise, the first transistor $Q_1$ is controlled to be conductive. When the square wave has the negative value and when the second DC control signal $V_{DC2}$ is smaller than the triangular wave, the second gate control signal $V_{Q2}$ is configured to control the second transistor $Q_2$ to be nonconductive. Otherwise, the second transistor $Q_2$ is controlled to be conductive.

The square wave is switched to negative value or positive value at the moment when the AC voltage $V_{AC}$ is zero, and hence the first and second transistors Q1 and Q2 are assured to switch to conduction at zero voltage. The triangular wave serves as a reference signal to be compared with the first DC control signal $V_{DC1}$ and the second DC control signal $V_{DC2}$. When absolute values of the first DC control signal $V_{DC1}$ and the second DC control signal $V_{DC2}$ are smaller, the time of conduction of the first and second transistors $Q_1$ and $Q_2$ is longer, charging time of the second capacitor $C_{S2}$ is longer, and thus the equivalent capacitance of the adjustable capacitive member 52 is larger.

Since the digital-analog conversion is adopted, an output signal of a present microcontroller has limited resolution. When a Q factor of the resonant circuit 5 (of circuit, not the typical component Q) is higher, the output voltage is more sensitive to variation of the equivalent capacitance (see FIG. 1). At this moment, control of the output voltage is highly influenced by resolution of the switching controller 61 and the gate controller 63.

Figure 8:
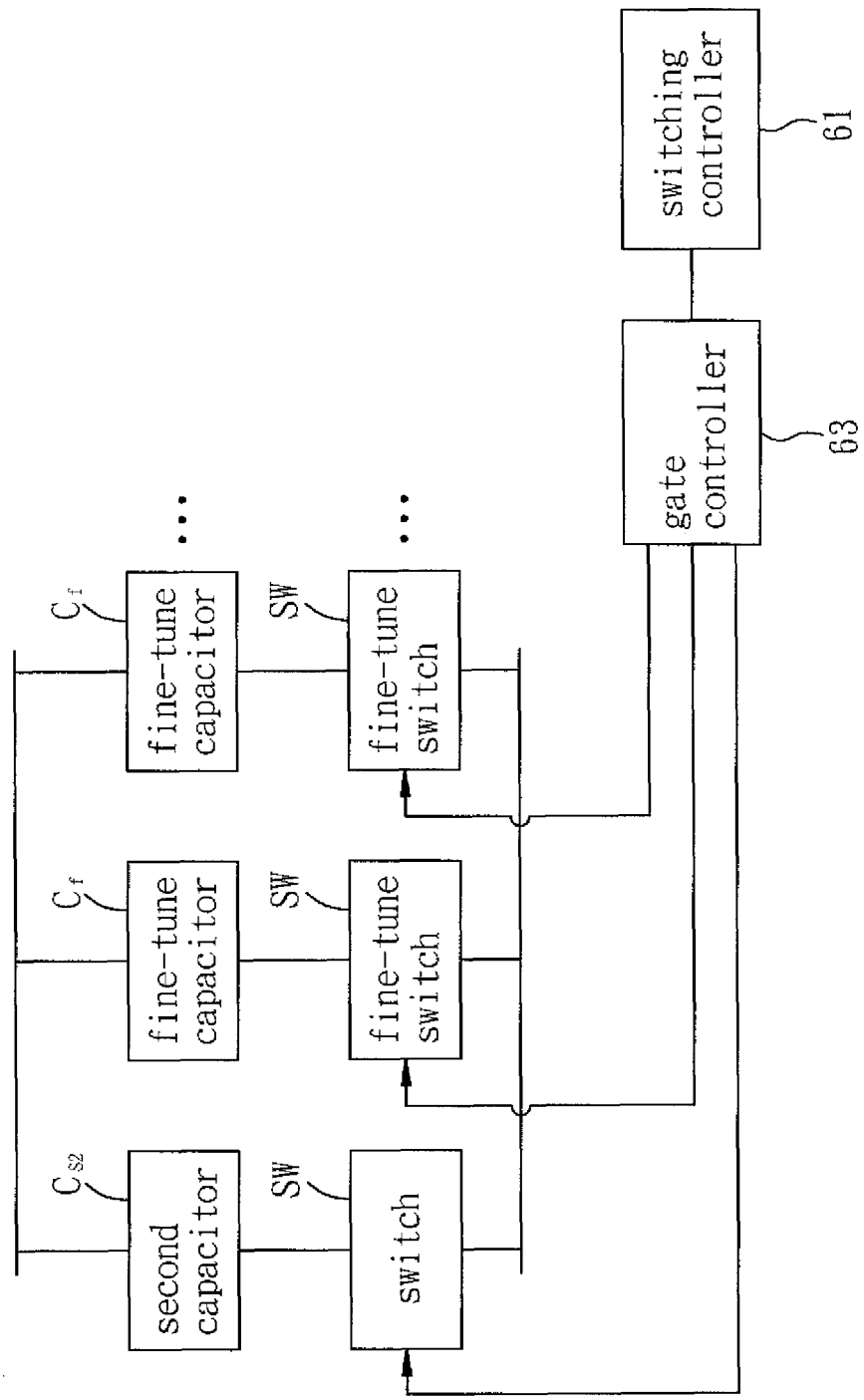
FIG. 8 is a schematic diagram illustrating that at least one series connection of a fine-tune reactance unit and a fine-tune switch is added to the first preferred embodiment.

To solve this issue, the equivalent capacitance may be further fine tuned in this preferred embodiment. Referring to FIG. 8, in order to implement this fine-tune function, the adjustable capacitive member 52 further includes at least one series connection of a fine-tune reactance unit and a fine-tune switch (SW). In this embodiment, the fine-tune reactance unit is a fine-tune capacitor $C_f$. The series connection of the fine-tune capacitor $C_f$ and the fine-tune switch (SW) is connected in parallel with the series connection of the second capacitor $C_{S2}$ and the switch (SW) (i.e., connected in parallel with the first capacitor $C_{S1}$). The fine-tune switch (SW) is coupled electrically to the gate controller 63 of the control circuit 6 and is controlled thereby to fine tune equivalent reactance of the fine-tune capacitor $C_f$ so as to vary the adjustable reactance of the resonant circuit 5. Capacitance of the fine-tune capacitor $C_f$ is smaller than that of the second capacitor $C_{S2}$, such that when the fine-tune switch (SW) is controlled by the same gate controller 63, the equivalent capacitance of the adjustable capacitive member 52 may be adjusted more delicately.

Figure 9:
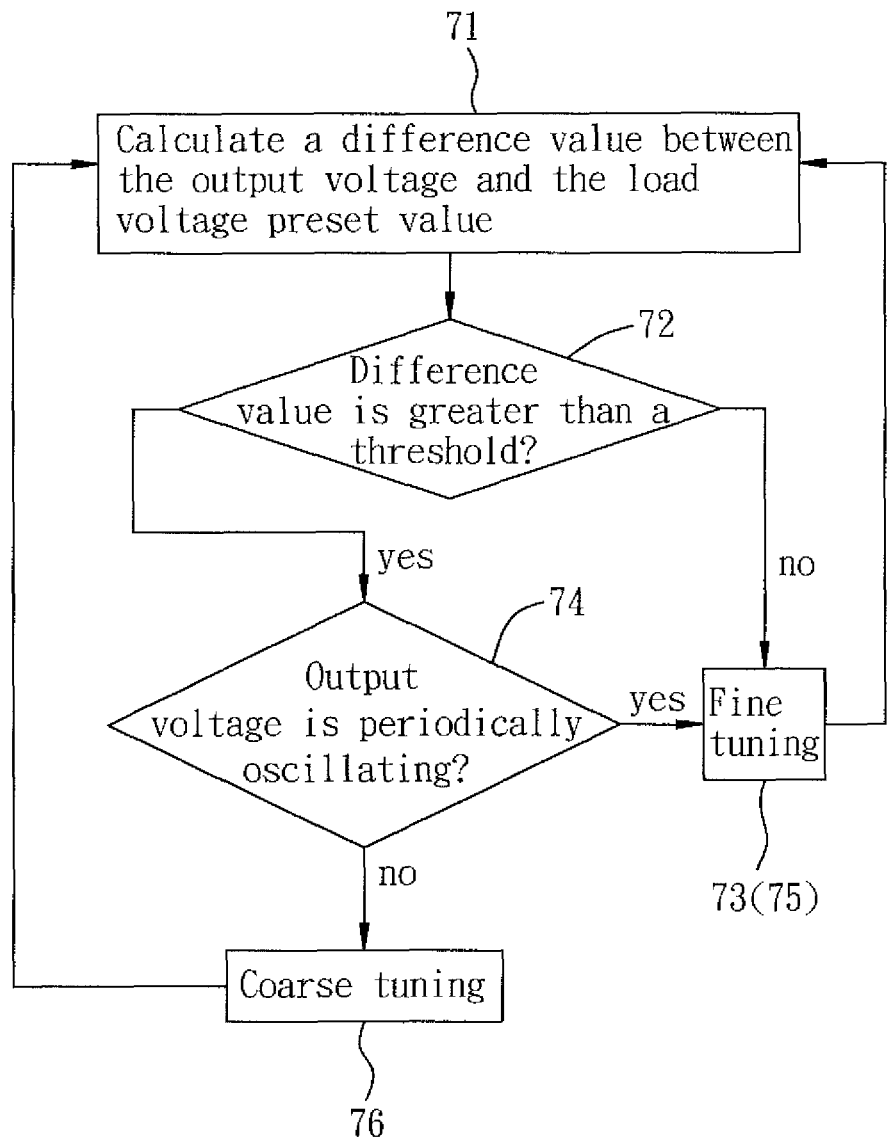
FIG. 9 is a flow chart for determining whether to fine tune equivalent reactance of the fine-tune reactance unit in the first preferred embodiment.

The control circuit 6 is further configured to perform a control method for determining whether the fine-tune function is required. Referring to FIG. 9, the control method includes the following steps:

In Step 71, the control circuit 6 is configured to calculate a difference between magnitude of the output voltage and the load voltage preset value so as to obtain a difference value.

In Step 72, the control circuit 6 is configured to determine whether the difference value is greater than a threshold.

In Step 73, the control circuit 6 is configured to control the fine-tune switch (SW) to fine tune the equivalent reactance of the fine-tune capacitor $C_f$, so as to vary the adjustable reactance of the resonant circuit 5 when it is determined in Step 72 that the difference value is not greater than the threshold.

In Step 74, the control circuit 6 is configured to determine whether the output voltage is periodically oscillating when it is determined in Step 72 that the difference value is greater than the threshold.

In Step 75, when it is determined in Step 74 that the output voltage is periodically oscillating, it means that the control signal U has reached the control limit of the current resolution such that the output voltage may not be adjusted precisely and thus oscillates continuously. The control circuit 6 is configured to fine tune the equivalent reactance of the fine-tune capacitor $C_f$ as described in Step 73.

In step 76, the control circuit 6 is configured to coarse tune the adjustable capacitive member 52 (i.e., only the original second capacitor $C_{S2}$ is adjusted) when it is determined in step 74 that the output voltage is not periodically oscillating.

After the fine tuning and the coarse tuning, the flow goes back to Step 71.

Figure 10:
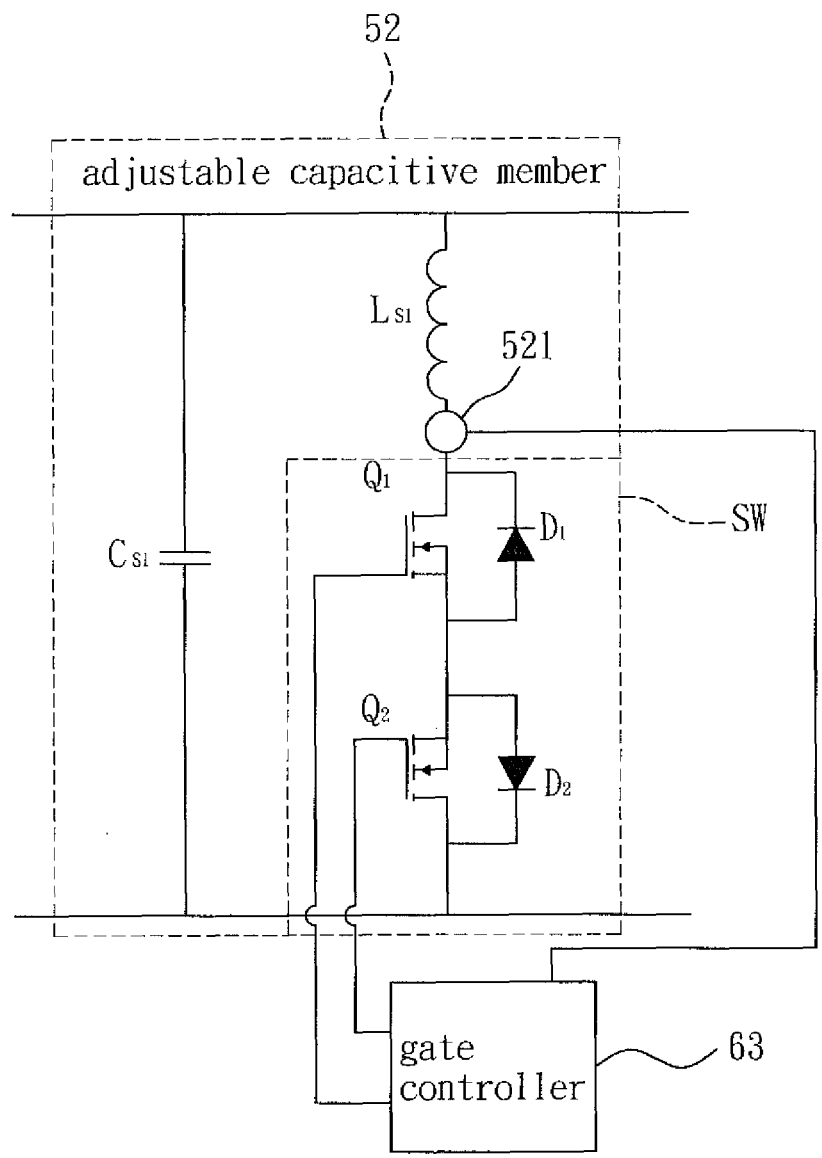
FIG. 10 is a schematic diagram illustrating a different part of a second preferred embodiment compared with the first preferred embodiment according to the present invention.
Figure 11:
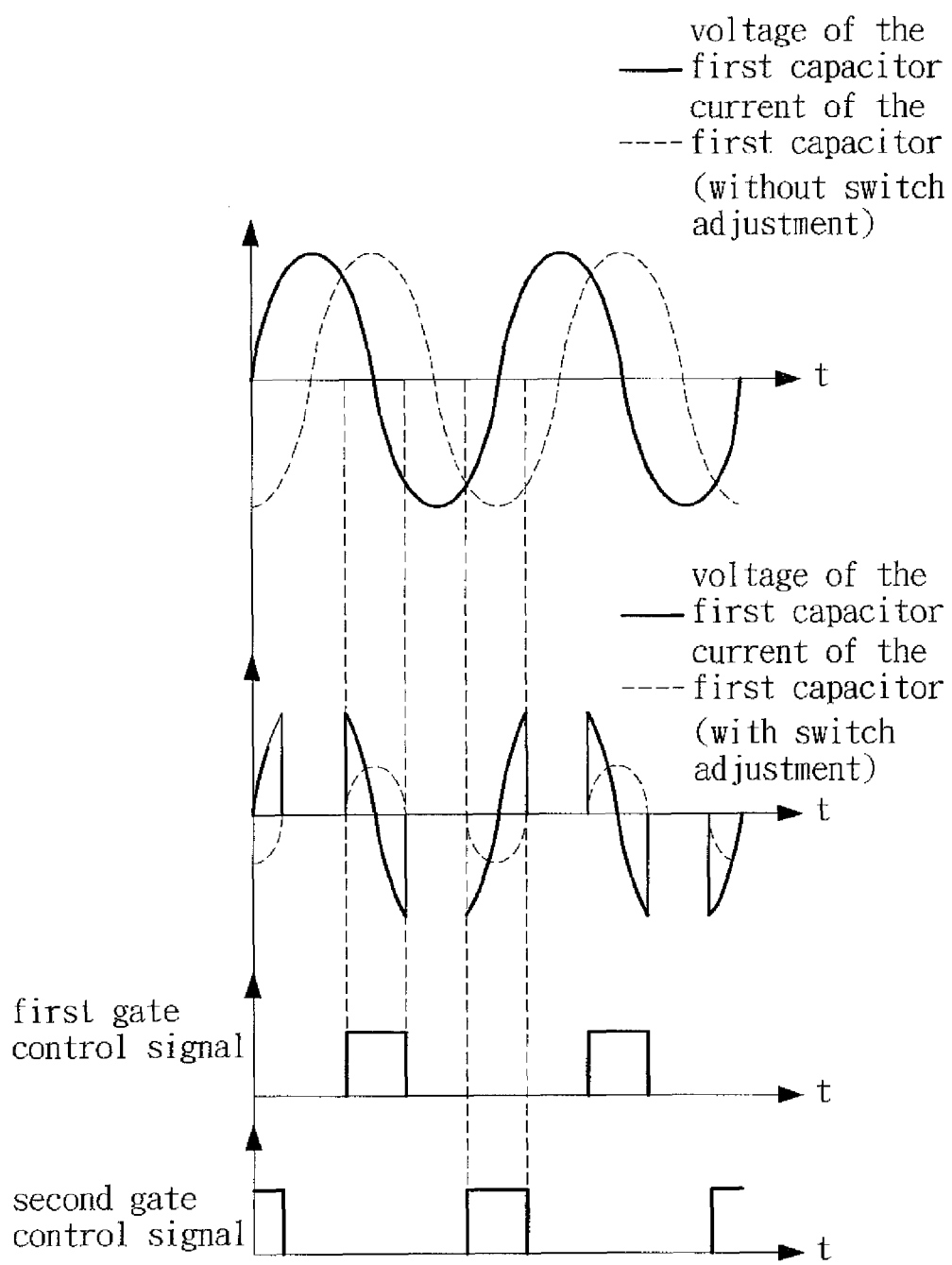
FIG. 11 illustrates an induced voltage and an induced current of a first inductor of the second preferred embodiment.

Referring to FIG. 10 and FIG. 11, a second preferred embodiment of the ICPT system according to the present invention differs from the first preferred embodiment in an arrangement that the adjustable reactance of the resonant circuit 5 is adjusted by way of adjusting an inductor in the second preferred embodiment.

More specifically, the adjustable capacitive member 52 includes a first capacitor $C_{S1}$, a first inductor $L_{S1}$ and a switch (SW). The first capacitor $C_{S1}$ is connected in parallel with a series connection of the first inductor $L_{S1}$ and the switch (SW). The switch (SW) is coupled electrically to the control circuit 6 and is controlled thereby to adjust equivalent inductance of the first inductor $L_{S1}$ so as to vary the adjustable reactance of the resonant circuit 5. The switch (SW) includes first and second transistors $Q_1$ and $Q_2$. The first and second transistors $Q_1$ and $Q_2$ are controlled by the control circuit 6 to switch between conduction and nonconduction. Reactances of the first inductor $L_{S1}$ and the first capacitor $C_{S1}$ are opposite in sign, and need to be properly selected so that a variation range of the equivalent capacitance of the adjustable capacitive member 52 may relate to three control intervals of the resonant circuit 5 (i.e., the fully-tuned, under-tuned and over-tuned intervals). The curve of output voltage versus resonant frequency is shown in FIG. 1.

The switch (SW) is controlled in a manner similar to that in the first preferred embodiment, but this manner differs in that when the first and second transistors $Q_1$ and $Q_2$ are switched from conduction to nonconduction, the zero current switching technique may be adopted so as to prevent switching loss. Therefore, the adjustable capacitive member 52 of the second preferred embodiment further includes a current detector 521 which is utilized to detect an induced current flowing through the first inductor $L_{S1}$, and which generates a current detecting signal according to the induced current thus detected. The gate controller 63 is coupled electrically to the current detector 521 for receiving the current detecting signal, and converts the current detecting signal into a square wave for subsequent control, so as to assure that the first and second transistors $Q_1$ and $Q_2$ are switched to nonconduction when the induced current is zero.

When the adjustable capacitive member 52 is required to be fine tuned, a fine-tune reactance unit in combination with a fine-tune switch (SW) may be adopted for implementing the aforesaid fine-tune function. The fine-tune reactance unit may be one of an inductor and a capacitor, and in the second preferred embodiment, a fine-tune inductor is favored.

Figure 14:
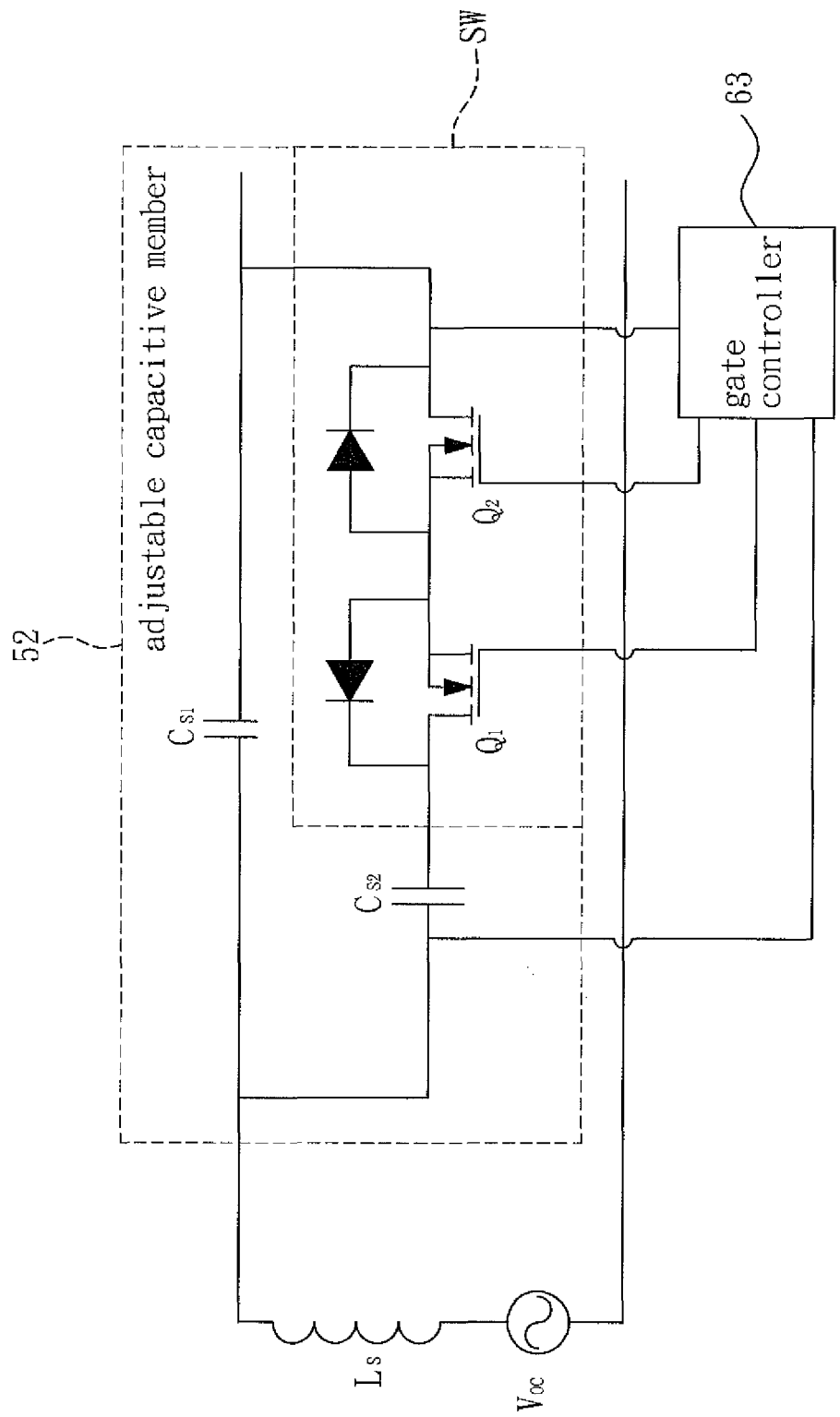
FIG. 14 is a schematic diagram illustrating a different part of a third preferred embodiment compared with the first preferred embodiment according to the present invention.

Referring to FIG. 14, a third preferred embodiment of the ICPT system according to the present invention differs from the first preferred embodiment in an arrangement that the resonant circuit 5 of the first preferred embodiment resonates in a manner that the secondary winding 51 and the adjustable capacitive member 52 are connected in parallel, while series connection is adopted in the third preferred embodiment. Specifically, in this embodiment, the adjustable capacitive member 52 is connected in series with the secondary winding 51, and includes a first capacitor $C_{S1}$, a second capacitor $C_{S2}$ and a switch (SW) as mentioned in the first preferred embodiment.

Figure 12:
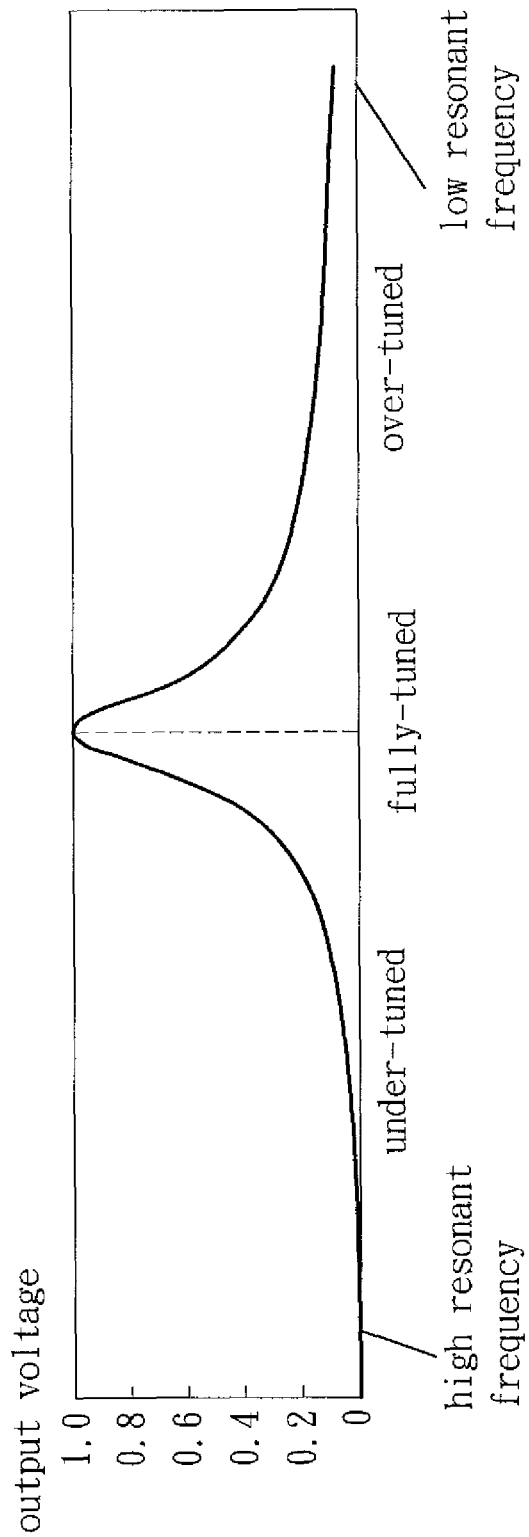
FIG. 12 is a curve of output voltage versus resonant frequency of a resonant circuit of a third preferred embodiment according to the present invention.

Referring to FIG. 12, when the resonant frequency of the resonant circuit 5 is adjusted, the curve of output voltage versus resonant frequency is still bell-shaped. The output voltage has a maximum value when the resonant frequency is substantially equal to an operating frequency (i.e. the frequency of the primary winding 1) of power supply. An interval corresponding to low equivalent capacitance (high resonant frequency) is the under-tuned interval, and an interval corresponding to high equivalent capacitance (low resonant frequency) is the over-tuned interval.

Figure 13:
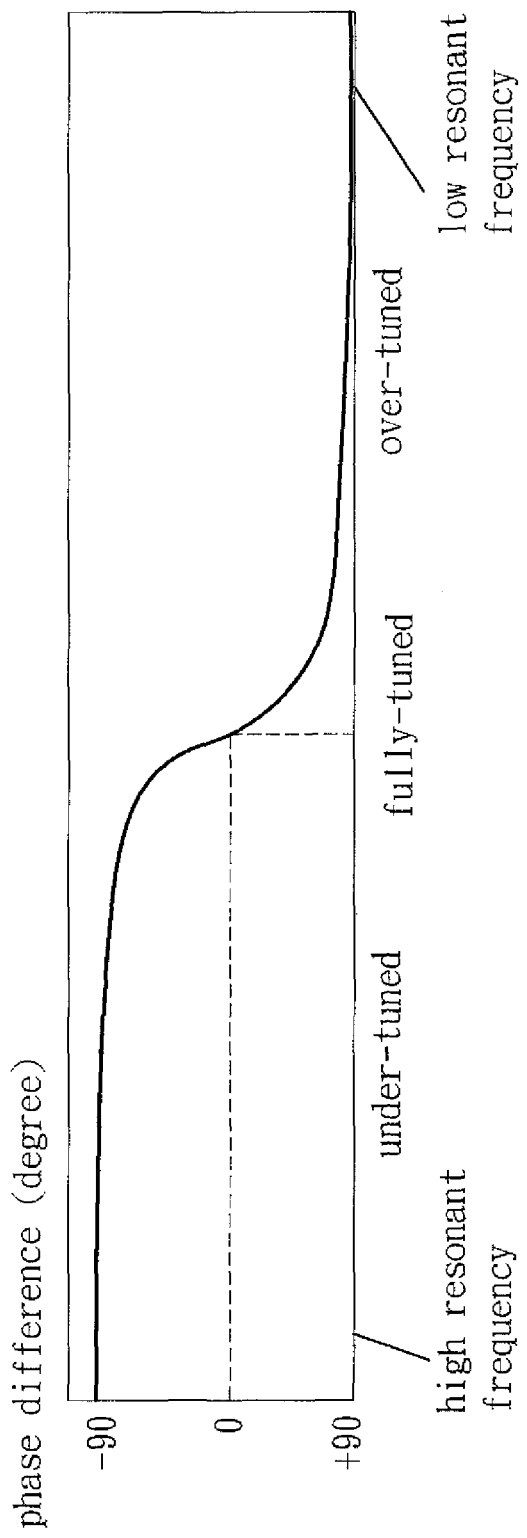
FIG. 13 illustrates a curve of phase difference versus resonant frequency of the third preferred embodiment, wherein the phase difference is between an AC voltage and an open-circuit voltage.

FIG. 13 illustrates a curve of phase difference versus resonant frequency, wherein the phase difference is between the AC voltage $V_{AC}$ and the open-circuit voltage $V_{OC}$, when the resonant circuit 5 resonates in a manner that the secondary winding 51 and the adjustable capacitive member 52 are connected in series. When the phase of the AC voltage $V_{AC}$ leads, corresponds to, and falls behind the phase of the open-circuit voltage $V_{OC}$, a respective one of the under-tuned, fully-tuned and over-tuned interval is correspondingly operated in. Therefore, by taking the zero-degree phase difference therebetween as a demarcation, which one of the intervals for adjustment is currently operated in may be determined. The discriminating element 626 stores a reference signal representing a phase difference of 0 degree. The other arrangements and ways for controlling are identical to those described in the first preferred embodiment.

Figure 15:
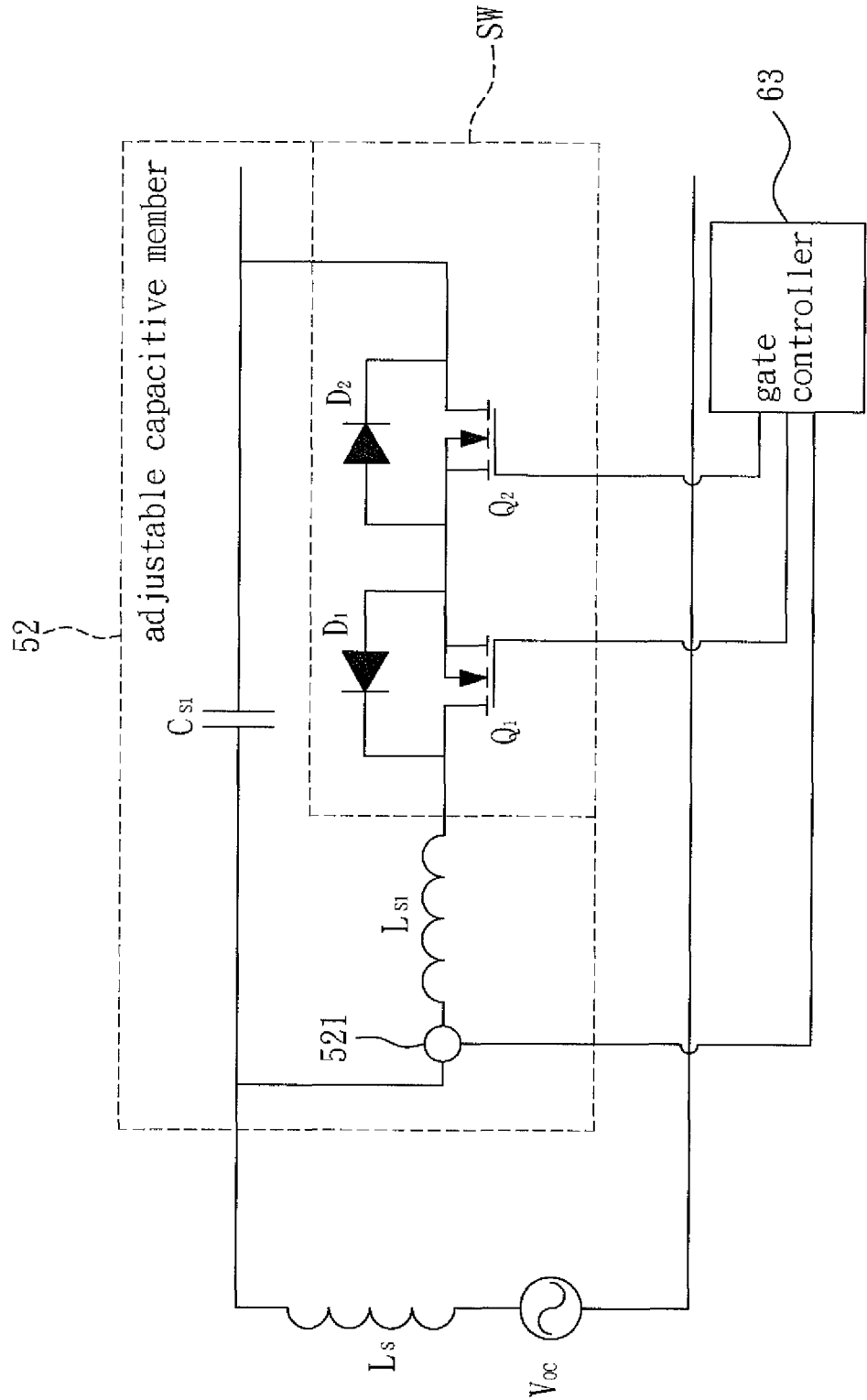
FIG. 15 is a schematic diagram illustrating a different part of a fourth preferred embodiment compared with the second preferred embodiment according to the present invention.

Referring to FIG. 15, a fourth preferred embodiment of the ICPT system according to the present invention differs from the second preferred embodiment in an arrangement that the resonant circuit 5 of the fourth preferred embodiment resonates in a manner that the secondary winding 51 and the adjustable capacitive member 52 are connected in series, while parallel connection is adopted in the second preferred embodiment. The ways for controlling are similar to those mentioned above.

To sum up, the preferred embodiments described herein have the following advantages:

1. Since the variation range of the equivalent capacitance of the adjustable capacitive member 52 may relate to three control intervals of the resonant circuit 5 (i.e., the fully-tuned, under-tuned and over-tuned intervals), since each of the first and second control units 611 and 612 is triggered to control the resonant circuit 5 which operates in the respective one of the under-tuned interval and the over-tuned interval, and since which one of the under-tuned interval and over-tuned interval for adjustment is currently operated in may be determined based on the phase difference, the equivalent capacitance to be adjusted may not diverge in one direction because of accidentally striding across different intervals for adjustment.

2. By means of fine tuning, the equivalent capacitance may be adjusted in a manner of striding across the under-tuned interval and the over-tuned interval so as to approach the fully-tuned interval, such that the present invention is suitable for a load which requires a high output voltage.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An inductively coupled power transfer (ICPT) system comprising:
    a primary winding for generating an electromagnetic field in response to an alternating current (AC); and
    a contactless ICPT device including
        a phase detecting winding which generates a detecting voltage according to induction of the electromagnetic field,
        a resonant circuit which has an adjustable reactance that is associated with a resonant frequency of said resonant circuit, and which is adapted to generate an AC voltage according to induction of the electromagnetic field and the adjustable reactance for supplying an output voltage associated with the AC voltage to a load, and
        a control circuit which is coupled electrically to said phase detecting winding and said resonant circuit and to be coupled electrically to the load, which compares a phase of the AC voltage with a phase of the detecting voltage so as to determine whether said resonant circuit operates in an under-tuned interval, where the output voltage monotonically decreases along with an increase in the resonant frequency, or an over-tuned interval, where the output voltage monotonically increases along with an increase in the resonant frequency, and which varies the adjustable reactance according to at least the output voltage and one of the under-tuned interval and the over-tuned interval in which said resonant circuit operates, for control of the output voltage;
    wherein said control circuit includes:
        a switching controller including a first control unit and a second control unit, each of which is to be coupled electrically to the load for detecting the output voltage across the load, and is triggered to control said resonant circuit which operates in a respective one of the under-tuned interval and the over-tuned interval so as to generate adjustment information associated with the output voltage, the adjustment information being to serve as a basis for varying the adjustable reactance, and
        an operation interval discriminator coupled electrically to said switching controller, and to said phase detecting winding and said resonant circuit for detecting respectively the detecting voltage and the AC voltage, and generating an operation interval indication signal according to a phase difference, which changes along with the adjustable reactance, between the detecting voltage and the AC voltage, so as to trigger one of said first and second control units based on the operation interval indication signal.

2. The ICPT system as claimed in claim 1, wherein said operation interval discriminator includes:
    an operating element that is coupled electrically to said phase detecting winding and said resonant circuit for detecting respectively the detecting voltage and the AC voltage, and that generates, according to the detecting voltage and the AC voltage, a logic operation signal that has a duty cycle associated with the phase difference between the detecting voltage and the AC voltage; and
    a discriminating element that is coupled electrically to said operating element for receiving the logic operation signal, that stores a reference signal representing a phase difference between the detecting voltage and the AC voltage at which the output voltage has a maximum value representing a fully tuned condition of said resonant circuit, and that generates the operation interval indication signal based on a comparison between the logic operation signal and the reference signal.

3. The ICPT system as claimed in claim 2, wherein said operation element includes:
    a first comparing unit coupled electrically to said phase detecting winding for receiving the detecting voltage, and comparing the detecting voltage with a reference voltage, so as to generate a first phase signal in a logic form;
    a second comparing unit coupled electrically to said resonant circuit for receiving the AC voltage, and comparing the AC voltage with the reference voltage, so as to generate a second phase signal in a logic form; and
    an AND logic gate coupled electrically to said first and second comparing units for receiving respectively the first and second phase signals, and performing logical conjunction on the first and second phase signals, so as to generate the logic operation signal.

4. The ICPT system as claimed in claim 2, wherein said discriminating element includes:
    a low-pass filter unit coupled electrically to said operating element for receiving the logic operation signal, and averaging the logic operation signal so as to output a direct current (DC) indication signal that is indicative of the phase difference between the detecting voltage and the AC voltage; and
    a third comparing unit coupled electrically to said low-pass filter unit for receiving the DC indication signal, and comparing the DC indication signal with the reference signal so as to generate the operation interval indication signal.

5. The ICPT system as claimed in claim 1,
    wherein each of said first and second control units stores a load voltage preset value, and is further coupled electrically to said operation interval discriminator for receiving the operation interval indication signal, a triggered one of said first and second control units that is triggered based on the operation interval indication signal comparing the output voltage with the load voltage preset value stored therein, so as to output a control signal that is included in the adjustment information and that is associated with adjustment of the adjustable reactance, and wherein said switching controller further includes a selector switch that is coupled electrically to said first and second control units, and to said operation interval discriminator for receiving the operation interval indication signal, and that is controlled by the operation interval indication signal to select, the control signal from said one of said first and second units that is triggered, based on the operation interval indication signal.

6. The ICPT system as claimed in claim 1, wherein said resonant circuit includes:
   a secondary winding which generates an open-circuit voltage according to induction of the electromagnetic field; and
   an adjustable capacitive member which is coupled electrically to said control circuit and to said secondary winding for receiving the open-circuit voltage, which generates the AC voltage, and which is controlled by said control circuit to vary the adjustable reactance of said resonant circuit.

7. The ICPT system as claimed in claim 6, wherein said adjustable capacitive member includes a first capacitor, and a second capacitor and a switch that are connected in series, said first capacitor being connected in parallel with said second capacitor and said switch that are connected in series, said switch being coupled electrically to said control circuit and controlled thereby to adjust equivalent capacitance of said second capacitor so as to vary the adjustable reactance of said resonant circuit.

8. The ICPT system as claimed in claim 7, wherein said adjustable capacitive member further includes at least one series connection of a fine-tune reactance unit and a fine-tune switch, said series connection being connected in parallel with said first capacitor, said fine-tune switch being coupled electrically to said control circuit and controlled thereby to fine tune equivalent reactance of said fine-tune reactance unit so as to vary the adjustable reactance of said resonant circuit.

9. The ICPT system as claimed in claim 8, wherein said control circuit is configured to:
   calculate a difference between magnitude of the output voltage and the load voltage preset value so as to obtain a difference value;
   control said fine-tune switch to fine tune the equivalent reactance of said fine-tune reactance unit so as to vary the adjustable reactance of said resonant circuit when the difference value is not greater than a threshold; and
   control said fine-tune switch to fine tune the equivalent reactance of said fine-tune reactance unit so as to vary the adjustable reactance of said resonant circuit when the difference value is greater than the threshold and the output voltage is periodically oscillating.

10. The ICPT system as claimed in claim 6, wherein said adjustable capacitive member includes a first capacitor, and a first inductor and a switch that are connected in series, said first capacitor being connected in parallel with said first inductor and said switch that are connected in series, said switch being coupled electrically to said control circuit and controlled thereby to adjust equivalent inductance of said first inductor so as to vary the adjustable reactance of said resonant circuit.

11. The ICPT system as claimed in claim 10, wherein said adjustable capacitive member further includes at least one series connection of a fine-tune reactance unit and a fine-tune switch, said series connection being connected in parallel with said first capacitor, said fine-tune switch being coupled electrically to said control circuit and controlled thereby to fine tune equivalent reactance of said fine-tune reactance unit so as to vary the adjustable reactance of said resonant circuit.

12. The ICPT system as claimed in claim 11, wherein said control circuit is configured to:
   calculate a difference between magnitude of the output voltage and the load voltage preset value so as to obtain a difference value;
   control said fine-tune switch to fine tune the equivalent reactance of said fine-tune reactance unit so as to vary the adjustable reactance of said resonant circuit when the difference value is not greater than a threshold; and
   control said fine-tune switch to fine tune the equivalent reactance of said fine-tune reactance unit so as to vary the adjustable reactance of said resonant circuit when the difference is greater than the threshold and the output voltage is periodically oscillating.

13. A contactless inductively coupled power transfer (ICPT) device comprising:
   a phase detecting winding which generates a detecting voltage according to induction of an electromagnetic field;
   a resonant circuit which has an adjustable reactance that is associated with a resonant frequency of said resonant circuit, and which is adapted to generate an AC voltage according to induction of the electromagnetic field and the adjustable reactance for supplying an output voltage associated with the AC voltage to a load; and
   a control circuit which is coupled electrically to said phase detecting winding and said resonant circuit and to be coupled electrically to the load, which compares a phase of the AC voltage with a phase of the detecting voltage so as to determine whether said resonant circuit operates in an under-tuned interval, where the output voltage monotonically decreases along with an increase in the resonant frequency, or an over-tuned interval, where the output voltage monotonically increases along with an increase in the resonant frequency, and which varies the adjustable reactance according to at least the output voltage and one of the under-tuned interval and the over-tuned interval in which said resonant circuit operates, for control of the output voltage;
   wherein said control circuit includes:
      a switching controller including a first control unit and a second control unit, each of which is to be coupled electrically to the load for detecting the output voltage across the load, and is triggered to control said resonant circuit which operates in a respective one of the under-tuned interval and the over-tuned interval so as to generate adjustment information associated with the output voltage, the adjustment information being to serve as a basis for varying the adjustable reactance, and
      an operation interval discriminator coupled electrically to said switching controller, and to said phase detecting winding and said resonant circuit for detecting respectively the detecting voltage and the AC voltage, and generating an operation interval indication signal according to a phase difference, which changes along with the adjustable reactance, between the detecting voltage and the AC voltage, so as to trigger one of said first and second control units based on the operation interval indication signal.

14. The contactless ICPT device as claimed in claim 13, wherein said operation interval discriminator includes:
   an operating element that is coupled electrically to said phase detecting winding and said resonant circuit for detecting respectively the detecting voltage and the AC voltage, and that generates, according to the detecting voltage and the AC voltage, a logic operation signal that has a duty cycle associated with the phase difference between the detecting voltage and the AC voltage; and a discriminating element that is coupled electrically to said operating element for receiving the logic operation signal, that stores a reference signal representing a phase difference between the detecting voltage and the AC voltage at which the output voltage has a maximum value representing a fully tuned condition of said resonant circuit, and that generates the operation interval indication signal based on a comparison between the logic operation signal and the reference signal.

15. The contactless ICPT device as claimed in claim 14, wherein said operation element includes:

a first comparing unit coupled electrically to said phase detecting winding for receiving the detecting voltage, and comparing the detecting voltage with a reference voltage, so as to generate a first phase signal in a logic form;

a second comparing unit coupled electrically to said resonant circuit for receiving the AC voltage, and comparing the AC voltage with the reference voltage, so as to generate a second phase signal in a logic form; and an AND logic gate coupled electrically to said first and second comparing units for receiving respectively the first and second phase signals, and performing logical conjunction on the first and second phase signals, so as to generate the logic operation signal.

16. The contactless ICPT device as claimed in claim 14, wherein said discriminating element includes:

a low-pass filter unit coupled electrically to said operating element for receiving the logic operation signal, and averaging the logic operation signal so as to output a direct current (DC) indication signal that is indicative of the phase difference between the detecting voltage and the AC voltage; and a third comparing unit coupled electrically to said low-pass filter unit for receiving the DC indication signal, and comparing the DC indication signal with the reference signal so as to generate the operation interval indication signal.

17. The contactless ICPT device as claimed in claim 13, wherein each of said first and second control units stores a load voltage preset value, and is further coupled electrically to said operation interval indication discriminator for receiving the operation interval indication signal, a triggered one of said first and second control units that is triggered based on the operation interval indication signal comparing the output voltage with the load voltage preset value stored therein, so as to output a control signal that is included in the adjustment information and that is associated with adjustment of the adjustable reactance, and wherein said switching controller further includes a selector switch that is coupled electrically to said first and second control units, and to said operation interval discriminator for receiving the operation interval indication signal, and that is controlled by the operation interval indication signal to select, the control signal from said one of said first and second units that is triggered, based on the operation interval indication signal.

18. The contactless ICPT device as claimed in claim 13, wherein said resonant circuit includes:

a secondary winding which generates an open-circuit voltage according to induction of the electromagnetic field; and an adjustable capacitive member which is coupled electrically to said control circuit and to said secondary winding for receiving the open-circuit voltage, which generates the AC voltage, and which is controlled by said control circuit to vary the adjustable reactance of said resonant circuit.

19. The contactless ICPT device as claimed in claim 18, wherein said adjustable capacitive member includes a first capacitor, and a second capacitor and a switch that are connected in series, said first capacitor being connected in parallel with said second capacitor and said switch that are connected in series, said switch being coupled electrically to said control circuit and controlled thereby to adjust equivalent capacitance of said second capacitor so as to vary the adjustable reactance of said resonant circuit.

20. The contactless ICPT device as claimed in claim 19, wherein said adjustable capacitive member further includes at least one series connection of a fine-tune reactance unit and a fine-tune switch, said series connection being connected in parallel with said first capacitor, said fine-tune switch being coupled electrically to said control circuit and controlled thereby to fine tune equivalent reactance of said fine-tune reactance unit so as to vary the adjustable reactance of said resonant circuit.

21. The contactless ICPT device as claimed in claim 20, wherein said control circuit is configured to:

calculate a difference between magnitude of the output voltage and the load voltage preset value so as to obtain a difference value;

control said fine-tune switch to fine tune the equivalent reactance of said fine-tune reactance unit so as to vary the adjustable reactance of said resonant circuit when the difference value is not greater than a threshold; and control said fine-tune switch to fine tune the equivalent reactance of said fine-tune reactance unit so as to vary the adjustable reactance of said resonant circuit when the difference value is greater than the threshold and the output voltage is periodically oscillating.

22. The contactless ICPT device as claimed in claim 18, wherein said adjustable capacitive member includes a first capacitor, and a first inductor and a switch that are connected in series, said first capacitor being connected in parallel with said first inductor and said switch that are connected in series, said switch being coupled electrically to said control circuit and controlled thereby to adjust equivalent inductance of said first inductor so as to vary the adjustable reactance of said resonant circuit.

23. The contactless ICPT device as claimed in claim 22, wherein said adjustable capacitive member further includes at least one series connection of a fine-tune reactance unit and a fine-tune switch, said series connection being connected in parallel with said first capacitor, said fine-tune switch being coupled electrically to said control circuit and controlled thereby to fine tune equivalent reactance of said fine-tune reactance unit so as to vary the adjustable reactance of said resonant circuit.

24. The contactless ICPT device as claimed in claim 23, wherein said control circuit is configured to:

calculate a difference between magnitude of the output voltage and the load voltage preset value so as to obtain a difference value;

control said fine-tune switch to fine tune the equivalent reactance of said fine-tune reactance unit so as to vary the adjustable reactance of said resonant circuit when the difference value is not greater than a threshold; and control said fine-tune switch to fine tune the equivalent reactance of said fine-tune reactance unit so as to vary the adjustable reactance of said resonant circuit when the difference is greater than the threshold and the output voltage is periodically oscillating.

* * * * *